(12) United States Patent
Song et al.

(10) Patent No.: US 9,776,671 B2
(45) Date of Patent: Oct. 3, 2017

(54) ASSEMBLING STRUCTURE OF VEHICLE BODY

(71) Applicant: Hyundai Motor Company, Seoul (KR)

(72) Inventors: Jong Seop Song, Hwaseong-Si (KR); Yong Kew Kim, Anyang-Si (KR)

(73) Assignee: Hyundai Motor Company, Seoul (KR)

( * ) Notice: Subject to any disclaimer, the term of this patent is extended or adjusted under 35 U.S.C. 154(b) by 18 days.

(21) Appl. No.: 14/934,082

(22) Filed: Nov. 5, 2015

(65) Prior Publication Data
US 2017/0015363 A1    Jan. 19, 2017

(30) Foreign Application Priority Data

Jul. 15, 2015 (KR) .................. 10-2015-0100321

(51) Int. Cl.
| | |
|---|---|
| *B60J 7/00* | (2006.01) |
| *B62D 25/14* | (2006.01) |
| *B62D 25/20* | (2006.01) |
| *B62D 25/04* | (2006.01) |
| *B62D 25/08* | (2006.01) |

(52) U.S. Cl.
CPC ........... *B62D 25/145* (2013.01); *B62D 25/04* (2013.01); *B62D 25/081* (2013.01); *B62D 25/14* (2013.01); *B62D 25/2036* (2013.01); *B62D 25/2045* (2013.01)

(58) Field of Classification Search
None
See application file for complete search history.

(56) References Cited

U.S. PATENT DOCUMENTS

| | | | | |
|---|---|---|---|---|
| 8,075,047 B2* | 12/2011 | Yamada | ............... | B62D 25/04 296/193.09 |
| 8,585,134 B2* | 11/2013 | Yasui | ............... | B62D 21/152 296/204 |
| 8,870,267 B2* | 10/2014 | Zischke | ............ | B62D 25/2018 296/187.03 |

(Continued)

FOREIGN PATENT DOCUMENTS

| | | |
|---|---|---|
| DE | 10 2011 088 688 A1 | 6/2013 |
| JP | 2006-88791 A | 4/2006 |

(Continued)

*Primary Examiner* — Kiran B Patel
(74) *Attorney, Agent, or Firm* — Morgan Lewis & Bockius LLP

(57) ABSTRACT

An assembling structure of a vehicle body may include side sill members provided in a length direction of a vehicle at both side portions of a lower portion of the vehicle body, respectively, a dash cross member provided in a width direction of the vehicle, both side end portions thereof being assembled to front end portions of the side sill members, center members provided in the length direction of the vehicle between the side sill members and a central portion of the vehicle body, front end portions thereof being assembled to a lower end portion of the dash cross member, and reinforcing members provided in the width direction of the vehicle between the center members and the side sill members, a first end portion of each reinforcing members being assembled to the center members and a second end portion of each reinforcing members being assembled to the side sill members.

6 Claims, 2 Drawing Sheets

(56) References Cited

U.S. PATENT DOCUMENTS

| | | | |
|---|---|---|---|
| 8,939,496 B2* | 1/2015 | Obayashi | B62D 21/152 |
| | | | 296/187.08 |
| 9,056,633 B2* | 6/2015 | Lohmann | B62D 25/025 |
| 9,073,578 B2* | 7/2015 | Chikazawa | B62D 21/155 |
| 2012/0256448 A1 | 10/2012 | Yasui et al. | |
| 2013/0049407 A1* | 2/2013 | Kageyama | B62D 25/2018 |
| | | | 296/204 |
| 2015/0008703 A1 | 1/2015 | Furusaki et al. | |
| 2017/0001669 A1* | 1/2017 | Ohigashi | B62D 25/2018 |

FOREIGN PATENT DOCUMENTS

| | | |
|---|---|---|
| JP | 2013-169823 A | 9/2013 |
| KR | 10-2011-0042855 A | 4/2011 |
| KR | 10-2011-0058181 A | 6/2011 |
| WO | WO 97/29005 A1 | 8/1997 |
| WO | WO 2011/055695 A1 | 5/2011 |
| WO | WO 2014/162493 A1 | 10/2014 |

* cited by examiner

ASSEMBLING STRUCTURE OF VEHICLE BODY

CROSS REFERENCE TO RELATED APPLICATION

The present application claims priority to Korean Patent Application No. 10-2015-0100321, filed Jul. 15, 2015, the entire contents of which is incorporated herein for all purposes by this reference.

BACKGROUND OF THE INVENTION

Field of the Invention

The present invention relates to an assembling structure of a vehicle body capable of satisfying safety required in order to protect passengers at the time of collision of a vehicle.

Description of Related Art

Generally, a structure of a vehicle body configuring a framework of a vehicle is required to be designed so as to prevent damage to and deformation of the vehicle body in order to safely protect passengers in the vehicle from impact and a load of a lower portion of the vehicle body that may be generated under a collision situation.

Therefore, in a general assembling structure of a vehicle body, shapes of or assembling relationship between the respective members configuring the structure of a vehicle body are designed in consideration of a magnitude and a direction of impact generated at the time of collision of the vehicle to effectively prevent the damage or the deformation due to impact transferred from the outside, thereby improving safety of the passengers in the vehicle.

However, due to driving characteristics of the vehicle driven forward, impact transferred from the front to an indoor space at the time of front collision of the vehicle is very large, and a front side of the vehicle is provided with various components of the vehicle. Therefore, at the time of the front collision of the vehicle, the components of the vehicle forcibly move toward the passengers and a front portion of the indoor space of the vehicle is depressed inward.

In order to prevent the depression of the indoor space of the vehicle and improve safety, a frame made of steel having high strength has been used or a reinforcing member has been added as a current structure of a vehicle body to promote improvement of safety for the front impact of the vehicle. In addition, many enterprises have continuously made an effort to improve the safety of the assembling structure of a vehicle body.

However, in the assembling structure of a vehicle body as described above, the prior art is uneconomical in manufacturing the vehicle and is ineffective in setting a load path that all of members configuring the vehicle body are made of a material having high strength.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a lower structure of a vehicle body capable of satisfying safety required in order to protect passengers at the time of collision of a vehicle.

According to various aspects of the present invention, an assembling structure of a vehicle body may include side sill members provided in a length direction of a vehicle at both side portions of a lower portion of the vehicle body, respectively, a dash cross member provided in a width direction of the vehicle, both side end portions thereof being assembled to front end portions of the side sill members that they face, respectively, center members provided in the length direction of the vehicle between the side sill members and a central portion of the vehicle body, front end portions thereof being assembled to a lower end portion of the dash cross member, and reinforcing members provided in the width direction of the vehicle between the center members and the side sill members, a first end portion of each of the reinforcing members being assembled to the center members and a second end portion of each of the reinforcing members being assembled to the side sill members.

The dash cross member may be surface-adhered to a lower end of a rear surface of a dash panel extended in a height direction of the vehicle between the front end portions of the side sill members.

The assembling structure may further include A-pillar members provided in a height direction of the vehicle, lower end portions thereof being assembled to the front end portions of the side sill members, a cowl beam provided in the width direction of the vehicle, both side portions thereof being assembled to central portions of the A-pillar members the side portions face, respectively, a center supporter provided in the height direction of the vehicle, an upper end portion thereof being assembled to a central portion of the cowl beam and a lower end portion thereof being assembled to a central portion of the dash cross member.

Both side portions of the dash cross member may be molded at a thickness thicker than the central portion thereof.

Both side portions of the dash cross member may be molded at a thickness thicker than the central portion thereof, and the side sill members, the reinforcing members, and the center members may include materials having strength higher than that of the dash cross member.

Both side portions of the dash cross member may be molded at a thickness thicker than the central portion thereof, and the side sill members, the reinforcing members, a center upper member, the center supporter, the cowl beam, and the A-pillar members may include of materials having strength higher than that of the dash cross member.

The assembling structure may further include rear lower members including a material having strength higher than that of the dash cross member and provided in the length direction of the vehicle below the dash cross member and the center members.

The assembling structure may further include front side members comprising a material having strength lower than that of the rear lower members and provided in the length direction of the vehicle at both side portions of the front of the dash cross member, rear end portions thereof being assembled to front end portions of the rear lower members.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
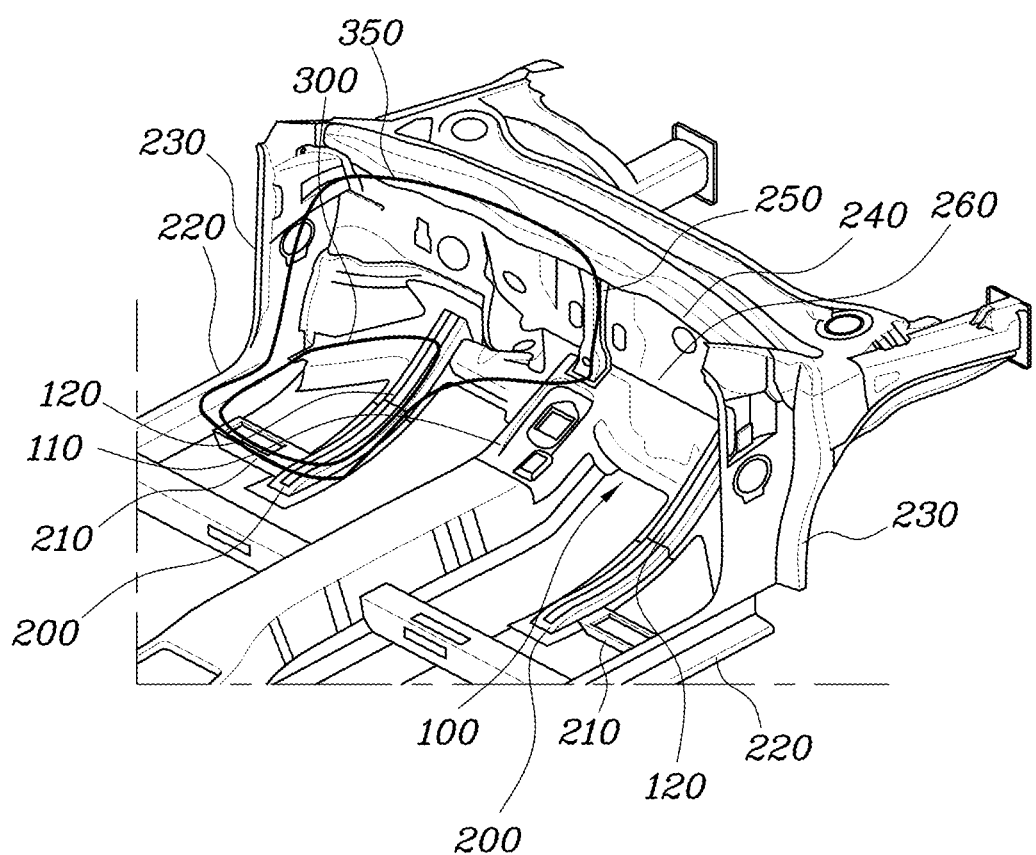
FIG. 1 is a perspective view illustrating an exemplary assembling structure of a vehicle body according to the present invention.
Figure 2:
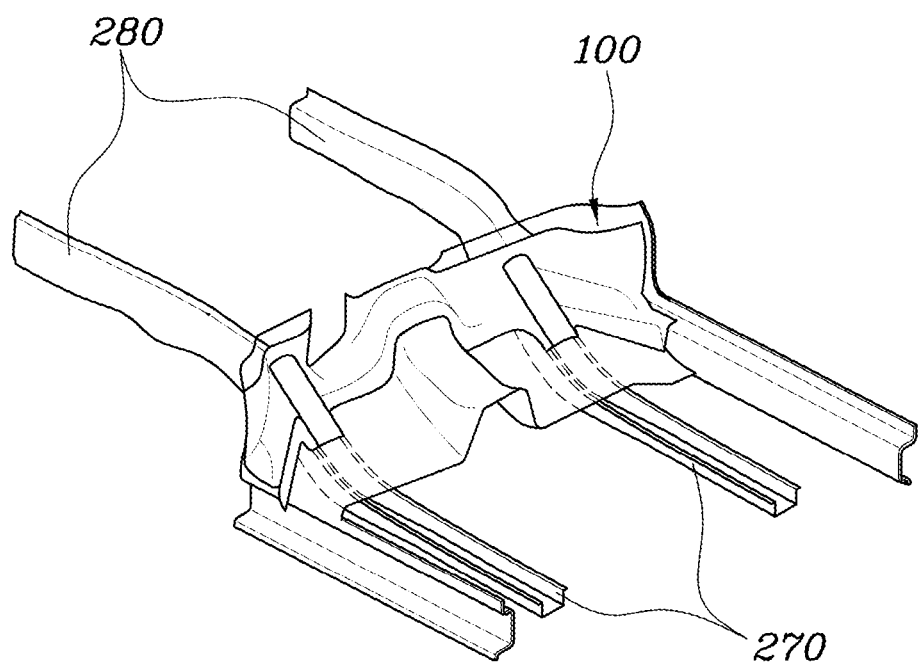
FIG. 2 is a perspective view illustrating a front side member in the exemplary assembling structure of a vehicle body according to the present invention.

FIG. 1 is a perspective view illustrating an assembling structure of a vehicle body according to various embodiments of the present invention, and FIG. 2 is a perspective view illustrating a front side member in the exemplary assembling structure of a vehicle body according to various embodiments of the present invention.

Safety required in order to protect passengers at the time of collision of a vehicle may be simply and effectively satisfied by an assembling structure of a vehicle body according to various embodiments of the present invention.

As illustrated in FIG. 1, the assembling structure of a vehicle body according to various embodiments of the present invention is configured to include side sill members 220 provided in a length direction of a vehicle at both side portions of a low portion of the vehicle body, respectively, a dash cross member 100 provided in a width direction of the vehicle, both side end portions thereof being assembled to front end portions of the side sill members 220 that they face, respectively, center members 200 provided in the length direction of the vehicle between the side sill members 220 and a central portion of the vehicle body, front end portions thereof being assembled to a lower end portion of the dash cross member 100, and reinforcing members 210 provided in the width direction of the vehicle between the center members 200 and the side sill members 220, one end portions thereof being assembled to the center members 200 and the other end portions thereof being assembled to the side sill members 220.

These components will be described in detail. The side sill members 220 are provided in the length direction of the vehicle at both side portions of the low portion of the vehicle body, respectively.

FIG. 1 illustrates a form in which the side sill members 220 are assembled to both side portions of a floor member configuring the lower portion of the vehicle body. The side sill members 220 support a load of the vehicle at the lower portion of the vehicle body and absorb impact of side surfaces.

In addition, the dash cross member 100 is provided in the width direction of the vehicle, both side end portions thereof being assembled to the front end portions of the side sill members 220 that they face, respectively.

The dash cross member 100 is positioned at a lower end of a front side of an indoor space of the vehicle and serves to protect the indoor space from impact generated in the front.

The dash cross member 100 is assembled to the side sill members 220 to transfer impact from the front and impact transferred from sides between the front and the sides, thereby promoting improvement of safety through impact dispersion.

Meanwhile, the center members 200 are provided in the length direction of the vehicle between the side sill members 220 and the central portion of the vehicle body, the front end portions thereof being assembled to the lower end portion of the dash cross member 100.

The center members 200 are provided between a tunnel part formed at a central portion of the floor member and the side sill members 220, and are members that become paths transferring a load in the length direction of the vehicle and reinforce the lower portion of the vehicle body.

The center members 200 have the front end portions assembled to one side of the dash cross member 100 to partially absorb impact transferred to the dash cross member 100, thereby promoting improvement of safety through impact dispersion.

In addition, the reinforcing members 210 are provided in the width direction of the vehicle between the center members 200 and the side sill members 220, one end portions thereof being assembled to the center members 200 and the other end portions thereof being assembled to the side sill members 220.

The reinforcing members 210 connect the center members 200 and the side sill members 220 to each other to configure a load path transferring impact from any one of the center members 200 and the side sill members 220 to the other when the impact is transferred to any one of the center members 200 and the side sill members 220. In addition, the reinforcing members 210 are provided in the width direction of the vehicle to serve to absorb impact generated at the side surfaces.

A general lower structure of a vehicle body does not include members connecting the center members 200 and the side sill members 220 to each other, such that the lower portion of the vehicle body is deformed between the center members 200 and the side sill members 220 when the impact is generated at the time of the side surfaces. There is a high risk that the passenger will be injured when these portions, which are lower regions of the passengers, are deformed.

Therefore, the reinforcing members 210 are added to connect the side sill members 220 and the center members 200 to each other while protecting the lower regions of the passengers, thereby forming one load path as a whole.

Particularly, as illustrated in FIG. 1, in the assembling structure of a vehicle body according to various embodiments of the present invention, the dash cross member 100, the side sill members 220, the reinforcing members 210, and the center members 200 are assembled to each other to form annular protecting structures.

These local annular structures 300 are formed below the passengers requiring the highest safety to protect the passengers from impact of the vehicle and prevent deformation of the vehicle body. Since deformation of regions in which the local annular structures 300 are formed may lead to inuring the passengers, high safety is demanded in these regions.

Particularly, impact transferred from the front is transferred to the dash cross member 100 and is then dispersed and transferred to the side sill members 220 and the center members 200, and the side sill members 220 and the center members 200 provided in the length direction of the vehicle have strong resistance to the front impact transferred from the dash cross member 100.

In addition, a phenomenon that one side of the side sill members 220 and the center members 200 are bent due to the front impact may occur. However, the reinforcing members 210 are provided between the respective members to reinforce the phenomenon that one side of the side sill members 220 and the center members 200 are bent and disperse a load between the respective members, thereby forming an efficient impact dispersing structure.

Meanwhile, the local annular structures 300 formed by assembling the respective members to each other is very advantageous in improving vibration noise of the vehicle. The vibration noise may be generated in members or panels configuring the vehicle body depending on driving of the vehicle or the surrounding situation. However, assembling relationships between the respective members are formed, thereby making it possible to decrease the vibration noise and increase efficiency for controlling natural vibration modes of the panels.

Meanwhile, as illustrated in FIG. 1, the dash cross member 100 of the assembling structure of a vehicle body according to various embodiments of the present invention may be surface-adhered to a lower end of a rear surface of a dash panel 260 extended in a height direction of the vehicle between the front end portions of the side sill members 220.

The dash panel, which is a panel traversing between the indoor space and a front head part of the vehicle, divides the indoor space from an engine, or the like, positioned at the front of the vehicle. In addition, the dash panel is a means preventing a plurality of devices provided at an engine side of the vehicle from invading the indoor space at the time of the front collision of the vehicle.

Generally, the dash cross member 100 is assembled to a surface of the dash panel 260 facing a region in which the engine, or the like, is positioned, which is a front side of the dash panel 260. Therefore, an assembling relationship between the dash cross member 100 and other members positioned in the indoor space of the vehicle may not be formed.

Therefore, the dash cross member 100 is surface-attached to a surface of the dash panel adjacent to the indoor space, such that an assembling relationship between the dash cross member 100 and other members configuring the indoor space is enhanced, thereby making it possible to allow the annular structures to be formed. As a result, safety of the passengers at the front side of the vehicle may be secured.

In addition, preferably, the dash cross member 100 is surface-attached to the surface of the dash panel 260 adjacent to the indoor space, such that connectivity between the dash cross member 100 and other members is significantly enhanced, thereby significantly increasing assembling force between the dash cross member 100 and A-pillar members 230. Therefore, twisting of the A-pillar members 230 may be prevented, and driving rigidity is increased, such that steering and handling performance may be significantly improved.

Meanwhile, as illustrated in FIG. 1, the assembling structure of a vehicle body according to various embodiments of the present invention may further include the A-pillar members 230 provided in the height direction of the vehicle, lower end portions thereof being assembled to the front end portions of the side sill members 220, a cowl beam 240 provided in the width direction of the vehicle, both side portions thereof being assembled to central portions of the A-pillar members 230 that they face, respectively, and a center supporter 250 provided in the height direction of the vehicle, an upper end portion thereof being assembled to a central portion of the cowl beam 240 and a lower end portion thereof being assembled to a central portion 110 of the dash cross member 110.

In detail, the A-pillar members 230 are provided in the height direction of the vehicle, the lower end portions thereof being assembled to the front end portions of the side sill members 220. FIG. 1 illustrates that the A-pillar members 230 form assembling relationships with the dash cross member 100, the dash panel, and the side sill members 220 at the front side of the vehicle.

Pillar members become structures configuring the surrounding of the vehicle in which doors are formed at the sides of the vehicle. Particularly, the A-pillar members 230 are provided at assembled portions of doors of front seats, which are the front of the vehicle, and support an upper structure of the vehicle and protect the indoor space from side collision.

Meanwhile, the A-pillar members 230 are assembled to the side sill members 220, such that impact transferred to the A-pillar members 230 may be partially transferred to the side sill members 220, thereby improving safety against the impact.

In addition, the cowl beams 240 are provided in the width direction of the vehicle, both side portions thereof being assembled to the central portions of the A-pillar members 230 that they face, respectively. FIG. 1 illustrates that the cowl beam 240 is assembled to an upper end of the dash panel 260, both side end portions of the cowl beam 240 being assembled to the A-pillar members 230.

The cowl beam 240 is positioned at a portion adjacent the indoor space at a point provided with a cowl top cover in the dash panel 260, and is provided in the width direction of the vehicle to reinforce the dash panel 260.

Therefore, when the impact transferred from the front side of the vehicle is transferred to the dash panel 260, the cowl beam 240 shares a partial load and transfers the load to the A-pillar members 230. Therefore, a plurality of members disperse and undertake the impact at the front side of the vehicle, thereby making it possible to improve safety of the vehicle and prevent fracture of the respective members.

Meanwhile, the center support 250 is provided in the height direction of the vehicle, the upper end portion thereof being assembled to the central portion of the cowl beam 240 and the lower end portion thereof being assembled to the central portion 110 of the dash cross member 110. FIG. 1 illustrates a form in which the center support 250 is assembled to a central portion of the dash panel 260.

The center supporter 250 is provided in the height direction of the vehicle at the central portion of the dash panel 260 to reinforce the dash panel 260. Preferably, an upper end of the center supporter 250 is assembled to the cowl beam 240 and a lower end of the center supporter 250 is assembled to the dash cross member 100 to configure a load path.

Therefore, since the impact transferred from the front is dispersed along the load path formed by the center supporter 250 and is then transferred to the respective members, the safety of the vehicle body against the impact may be increased, and the fracture of the respective members may be prevented.

Particularly, the center supporter 250, the cowl beam 240, and the A-pillar members 230 are assembled to the annular structures formed at lower ends of passenger's seats to form large annular structures 350 including a front surface of the vehicle body.

Protecting regions formed by the large annular structures 350 disperse the impact transferred from the front of the vehicle to the respective members forming assembling relationships therebetween, thereby making it possible to significantly improve a deformation amount of the indoor space of the vehicle while preventing the fracture of the members even at larger impact and protect the interior of the vehicle.

In addition, the large annular structures 350 protect the indoor space of the vehicle together with the local annular structures 300. As a result, the local annular structures 300 disperse the impact at lower end portions of the passengers at which prevention of deformation is required for the purpose of safety of the passengers, thereby suppressing a deformation amount of the vehicle body.

In addition, in order to prevent the impact generated at the time of the front collision of the vehicle and the devices disposed at the front of the vehicle from invading the interior, the large annular structures 350 are used, thereby making it possible to disperse the impact and significantly improve a deformation amount of the vehicle body.

That is, the local annular structures 300 and the large annular structures 350 form double annular structures, thereby making it possible to prevent deformation of and damage to the indoor space of the vehicle due to the collision of the vehicle and increase the safety of the passengers of the vehicle.

Meanwhile, the large annular structures 350 form assembling relationships with the local annular structures 300 at portions adjacent to the dash cross member 100 and the A-pillar members 230 to significantly improve vibration noise of the vehicle. Vibrations that may be generated in the respective members are suppressed through assembling relationships between the respective members, thereby making it possible to improve the vibration noise.

Meanwhile, in various embodiments of the present invention, both side portions 120 of the dash cross member 100 of the assembling structure of a vehicle body may be molded at a thickness thicker than the central portion 110 thereof.

As illustrated in FIG. 1, the dash cross member 100 forms assembling relationships with the side sill members 220, the A-pillar members 230, and the center members 200 at both side portions 120 thereof. The dash cross member 100 may be molded in various molding schemes. For example, the dash cross member 100 may be molded so that the respective portions thereof have different thicknesses by a rolling scheme or be molded by individually molding portions having different thicknesses and then using an assembling method such as a welding method, or the like.

The large annular structures 350 and the local annular structures 300 formed by the dash cross member 100 serve as the load paths. In these configuration portions, the impact is concentrated on assembled portions of the respective members, such that a risk that the assembled portions of the respective members will be damaged is relatively high. In addition, both side portions 120 of the dash cross member 100 correspond to regions on which the impact from the front of the vehicle or the impact from the side surfaces of the vehicle is concentrated in assembling relationships.

In addition, both side portions 120 of the dash cross member 100 correspond to positions at which the passengers of the vehicle are seated, such that high safety is required in both side portions 120 of the dash cross member 100 and required strength of both side portions 120 of the dash cross member 100 is also set to be high.

Therefore, in order to improve strength of both side portions 120 of the dash cross member 100, both side portions 120 of the dash cross member 100 are molded at a thickness thicker than that of the central portion 110 of the dash cross member 100, and a portion of the impact dispersed along the annular structures is transferred to the central portion 110 and is converted into deformation energy, such that the central portion 110 serves to absorb an impact amount.

Meanwhile, in the assembling structure of a vehicle body according to various embodiments of the present invention, both side portions 120 of the dash cross member 100 may be molded at the thickness thicker than that of the central portion 110 of the dash cross member 100, and the side sill members 220, the reinforcing members 210, and the center members 200 may be made of materials having strength higher than that of the dash cross member 100.

In detail, both side portions 120 of the dash cross member 100 are molded at the thickness thicker than that of the central portion 110 of the dash cross member 100 to increase strength, and the side sill members 220, the reinforcing members 210, and the center members 200 forming the local annular structures 300 are made of the materials having the strength higher than that of the dash cross member 100 to increase rigidity of the local annular structures 300.

Since the local annular structures 300 are regions in which the passengers are directly positioned, preferably, the smallest deformation is required in the local annular structures 300 even at the time of the collision of the vehicle. Therefore, strength of the respective members configuring the local annular structures 300 is increased to protect the passengers of the vehicle.

In addition, in the assembling structure of a vehicle body according to various embodiments of the present invention, both side portions 120 of the dash cross member 100 may be molded at the thickness thicker than that of the central portion 110 of the dash cross member 100, and the side sill members 220, the reinforcing members 210, a center upper member, the center supporter 250, the cowl beam 240, and the A-pillar members 230 may be made of materials having strength higher than that of the dash cross member 100.

In detail, both side portions 120 of the dash cross member 100 are molded at the thickness thicker than that of the central portion 110 of the dash cross member 100 to increase the strength, while the central portion 110 of the dash cross member 100 is formed at a relative low strength to thereby be deformed together with a central portion of a floor panel, thereby partially absorbing impact energy.

In addition, the side sill members 220, the reinforcing members 210, the center upper member, the center supporter 250, the cowl beam 240, and the A-pillar members 230 forming the large annular structure 350 are made of the materials having the strength higher than that of the dash cross member 100 to increase rigidity of the large annular structures 350.

Since the large annular structures 350 are region including the front of the passengers from the regions in which the passengers are directly positioned, preferably, the smallest deformation is required in the local annular structures 350 even at the time of the collision of the vehicle. Therefore, strength of the respective members configuring the large annular structures 300 is increased to protect the passengers of the vehicle.

Therefore, strength of the respective members dispersing and undertaking the impact transferred from the sides of the vehicle as well as the front of the vehicle with each other is increased, thereby making it possible to prevent damage to the respective members, protect the indoor space of the vehicle from stronger impact, and prevent devices of an engine part from invading the interior of the vehicle at the time of the front collision.

Meanwhile, as illustrated in FIG. 2, in various embodiments of the present invention, the assembling structure of a vehicle body may further include rear lower members 270 made of a material having strength higher than that of the dash cross member 100 and provided in the length direction of the vehicle below the dash cross member 100 and the center members 200.

The rear lower members 270 are provided in the length direction of the vehicle below the floor panel, and are, preferably, provided below the center members 200. In addition, preferably, the rear lower members 270 form assembling relationships with front side members provided at both sides of the front of the dash panel 260 to undertake the impact transferred from the front of the vehicle.

Since the rear lower members 270 are members undertaking a load of the vehicle body below the floor panel and having the impact of the front of the vehicle transferred thereto, it is required for the rear lower members 270 to have high strength. Therefore, preferably, the rear lower members 270 are made of the material having the strength higher than that of the dash cross member 100, thereby making it possible to undertake the load of the vehicle body and the impact of the front of the vehicle.

The material having high strength may be provided in various schemes such as a scheme of molding steel having high strength using a hot stamping method, a molding scheme using a synthetic material to which a reinforcing material is added, or the like.

As a result, the rear lower members are formed at high strength, such that they are not deformed while supporting the load of the vehicle body, and prevent damage to the vehicle body even at the time of the impact of the vehicle, thereby improving safety of the vehicle body.

Meanwhile, as illustrated in FIG. 2, the assembling structure of a vehicle body according to various embodiments of the present invention may further include front side members 280 made of a material having strength lower than that of the rear lower members 270 and provided in the length direction of the vehicle at both side portions of the front of the dash cross member 100, rear end portions thereof being assembled to front end portions of the rear lower members 270.

The front side members 280 are provided in the length direction of the vehicle at both side portions of the engine part formed at the front of the vehicle body and primarily undertake the impact before the impact is transferred to the indoor space at the time of the front collision of the vehicle body.

Here, the front side members 280 connected to the rear lower members transfer the impact transferred from the front to the indoor space of the vehicle through the rear lower members, or the like. However, when strength of the front side members 280 is excessively high, the impact transferred from the front is transferred to the indoor space of the vehicle as it is. Therefore, an impact amount undertaken by members disposed in the indoor space is large, such that a risk such as damage, or the like, is generated.

Therefore, the front side members 280 are made of, preferably, the material having the strength lower than that of the rear lower members 270 to absorb impact energy as deformation energy, thereby decreasing an impact amount transferred to the interior of the vehicle to increase the safety of the passengers.

That is, the front side members 280 are made of the material having the low strength in order to primarily absorb the impact energy as the deformation energy at points at which the front side members 280 are provided at the time of the front collision of the vehicle, and the rear lower members 270 undertaking the impact energy transferred from the front side members 280 are formed of the material having the high strength so as to prevent damage to and deformation of the vehicle body in order to protect the passengers.

In addition, impact transferred to the indoor space of the vehicle after the front side members 280 are deformed is prevented from being transferred to the passengers by the double annular structures formed in the indoor space of the vehicle, and a portion of the impact is absorbed as deformation energy at the central portion 110 of the dash cross member 100.

As a result, in the assembling structure of a vehicle body according to various embodiments of the present invention, the safety of the passengers may be significantly improved by assembling the respective members forming the assembling relationship therebetween to each other.

According to the assembling structure of a vehicle body having the structure as described above, the safety required in order to protect the passengers at the time of the collision of the vehicle may be satisfied.

Particularly, the dash cross member provided at the front side of the vehicle form assembling relationships with the surrounding members, such that the double annular load paths are formed at the front of the indoor space of the vehicle in which the passengers are positioned to efficiently disperse the load transferred to the front of the indoor space, thereby improving the safety for protecting the passengers from the transfer of the impact to the indoor space of the vehicle.

At the same time, some of the members configuring the indoor space of the vehicle body are made of steel having low strength, and a section absorbing the impact transferred from the indoor space to thereby be deformed and a section having high strength to protect the indoor space from the impact are formed, thereby making it possible to promote safety and efficiency in the assembling structure of a vehicle body.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An assembling structure of a vehicle body, comprising:
    side sill members provided in a length direction of a vehicle at both side portions of a lower portion of the vehicle body, respectively;
    a dash cross member provided in a width direction of the vehicle, both side end portions thereof being assembled to front end portions of the side sill members that they face, respectively;
    center members provided in the length direction of the vehicle between the side sill members and a central portion of the vehicle body, front end portions thereof being assembled to a lower end portion of the dash cross member; and
    reinforcing members provided in the width direction of the vehicle between the center members and the side sill members, a first end portion of each of the reinforcing members being assembled to the center members and a second end portion of each of the reinforcing members being assembled to the side sill members,
    wherein both side portions of the dash cross member are molded at a thickness thicker than the central portion thereof, and the side sill members, the reinforcing members, and the center members comprise materials having strength higher than materials of the dash cross member.

2. The assembling structure of the vehicle body of claim 1, wherein the dash cross member is surface-adhered to a lower end of a rear surface of a dash panel extended in a height direction of the vehicle between the front end portions of the side sill members.

3. The assembling structure of the vehicle body of claim 1, further comprising:
    A-pillar members provided in a height direction of the vehicle, lower end portions thereof being assembled to the front end portions of the side sill members;
    a cowl beam provided in the width direction of the vehicle, both side portions thereof being assembled to central portions of the A-pillar members the side portions face, respectively; and
    a center supporter provided in the height direction of the vehicle, an upper end portion thereof being assembled to a central portion of the cowl beam and a lower end portion thereof being assembled to a central portion of the dash cross member.

4. The assembling structure of the vehicle body of claim 3, wherein both side portions of the dash cross member are molded at a thickness thicker than the central portion thereof, and the side sill members, the reinforcing members, a center member, the center supporter, the cowl beam, and the A-pillar members are made of materials having strength higher than that of the dash cross member.

5. The assembling structure of the vehicle body of claim 1, further comprising rear lower members comprising a material having strength higher than that of the dash cross member and provided in the length direction of the vehicle below the dash cross member and the center members.

6. The assembling structure of the vehicle body of claim 5, further comprising front side members comprising a material having strength lower than that of the rear lower members and provided in the length direction of the vehicle at both side portions of the front of the dash cross member, rear end portions thereof being assembled to front end portions of the rear lower members.

* * * * *